(12) United States Patent
Burtscher et al.

(10) Patent No.: US 8,950,983 B2
(45) Date of Patent: Feb. 10, 2015

(54) CUTTING TOOL

(75) Inventors: Peter Burtscher, Haeselgehr (AT); Anton Diepold, Grainau (DE); Uwe Schleinkofer, Reutte (AT)

(73) Assignee: Ceratizit Austria Gesellschaft mbH, Ruette/Tirol (AT)

(*) Notice: Subject to any disclaimer, the term of this patent is extended or adjusted under 35 U.S.C. 154(b) by 121 days.

(21) Appl. No.: 13/377,409

(22) PCT Filed: Jun. 8, 2010

(86) PCT No.: PCT/AT2010/000199
§ 371 (c)(1),
(2), (4) Date: Dec. 9, 2011

(87) PCT Pub. No.: WO2010/141966
PCT Pub. Date: Dec. 16, 2010

(65) Prior Publication Data
US 2012/0082521 A1    Apr. 5, 2012

(30) Foreign Application Priority Data

Jun. 10, 2009  (AT) .................................. GM361/2009

(51) Int. Cl.
*B23C 5/22*    (2006.01)
*B23B 27/16*   (2006.01)
(52) U.S. Cl.
CPC ........... *B23C 5/2208* (2013.01); *B23B 27/1662* (2013.01); *B23B 2205/04* (2013.01); *B23B 2205/045* (2013.01); *B23C 2200/361* (2013.01); *B23C 2210/165* (2013.01); *B23C 2240/24* (2013.01)
USPC .............................. 407/105; 407/104; 407/48

(58) Field of Classification Search
CPC .................................. B23B 27/16; B23C 5/22
USPC ............................................. 407/102–106, 48
See application file for complete search history.

(56) References Cited

U.S. PATENT DOCUMENTS 3,284,874 A * 11/1966 Green et al. ................... 407/104
3,320,654 A *  5/1967 Lovendahl .................... 407/104
3,525,136 A *  8/1970 Crosby ......................... 407/105

(Continued)

FOREIGN PATENT DOCUMENTS

EP           450542 A  * 10/1991
EP       1 197 281 A1     4/2002

(Continued)

OTHER PUBLICATIONS

Austrian Patent Office Search Report Dated Apr. 22, 2010.

*Primary Examiner* — Andrea Wellington
*Assistant Examiner* — Sara Addisu
(74) *Attorney, Agent, or Firm* — Laurence A. Greenberg; Werner H. Stemer; Ralph E. Locher

(57) ABSTRACT

A cutting tool has a main tool body and at least one insert seat disposed thereon. The seat has a bottom surface for mounting a cutting insert, and further has a dowel pin, which penetrates a through-hole of the mounted cutting insert and the bottom surface and can be fixed to the main tool body. A center longitudinal axis of the fixed dowel pin is arranged at an acute angle with respect to the bottom surface. The dowel pin contains a spherical segment for mounting on a bearing surface of the through-hole. The surface of the spherical segment is interrupted by a segment groove.

16 Claims, 4 Drawing Sheets

(56) References Cited

U.S. PATENT DOCUMENTS

| | | | |
|---|---|---|---|
| 3,708,843 A * | 1/1973 | Erkfritz | 407/38 |
| 3,740,807 A | 6/1973 | Getts | |
| 3,913,197 A * | 10/1975 | Wolf | 407/47 |
| 4,283,163 A | 8/1981 | Gräfe et al. | |
| 4,398,853 A * | 8/1983 | Erickson | 407/104 |
| 4,427,322 A * | 1/1984 | Kroll | 407/105 |
| 4,430,031 A * | 2/1984 | Hellstrom | 407/104 |
| 4,487,533 A * | 12/1984 | Wermeister | 407/105 |
| 4,869,624 A * | 9/1989 | Viellet | 407/104 |
| 5,199,828 A * | 4/1993 | Forsberg et al. | 407/104 |
| 5,542,793 A * | 8/1996 | Deiss et al. | 407/35 |
| 6,155,754 A | 12/2000 | Jönsson | |
| 6,158,928 A * | 12/2000 | Hecht | 407/102 |
| 6,511,264 B2 * | 1/2003 | Ripley | 407/36 |
| 6,579,042 B1 | 6/2003 | Shiraiwa | |
| 6,709,204 B2 * | 3/2004 | Hellstrom et al. | 407/102 |
| 7,144,205 B2 * | 12/2006 | Sheffler et al. | 407/103 |
| 7,431,539 B2 * | 10/2008 | Erickson et al. | 407/104 |
| 7,597,509 B2 * | 10/2009 | Sheffler et al. | 407/103 |
| 7,806,632 B2 * | 10/2010 | Fouquer | 407/105 |
| 7,959,383 B2 * | 6/2011 | Choi et al. | 407/105 |
| 2003/0165362 A1 * | 9/2003 | Hecht | 407/107 |
| 2006/0198707 A1 * | 9/2006 | Sheffler et al. | 407/48 |
| 2007/0189862 A1 | 8/2007 | Viol | |
| 2008/0193233 A1 * | 8/2008 | Park | 407/104 |

FOREIGN PATENT DOCUMENTS

| | | | |
|---|---|---|---|
| FR | 2611152 A * | | 8/1988 |
| GB | 2 041 797 A | | 9/1980 |
| JP | 9-108909 A | | 4/1997 |
| JP | H09300110 A | | 11/1997 |
| JP | H11500964 A | | 1/1999 |
| JP | 2004-167635 A | | 6/2004 |
| WO | 2007/094723 A1 | | 8/2007 |

* cited by examiner

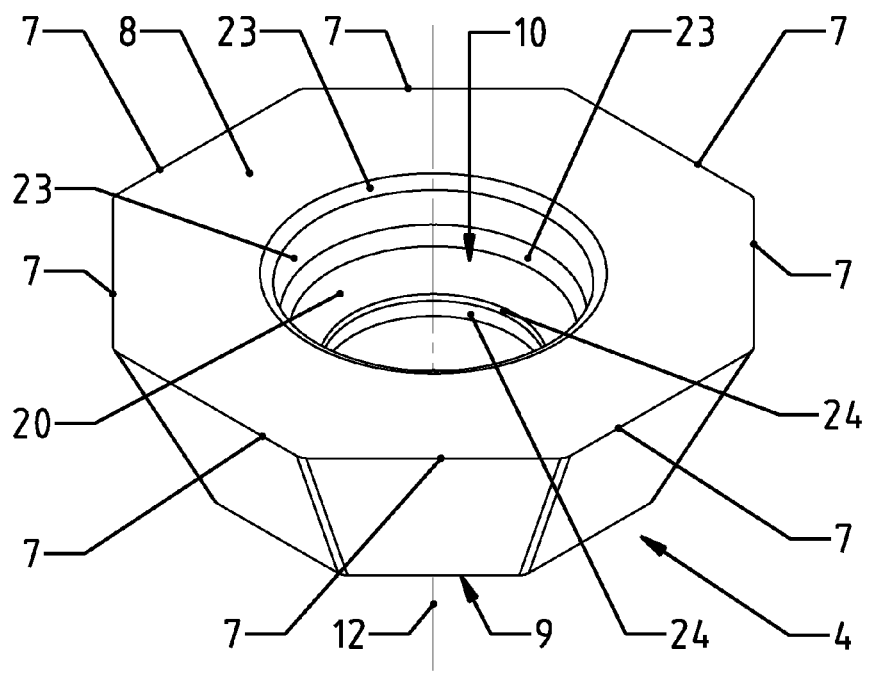
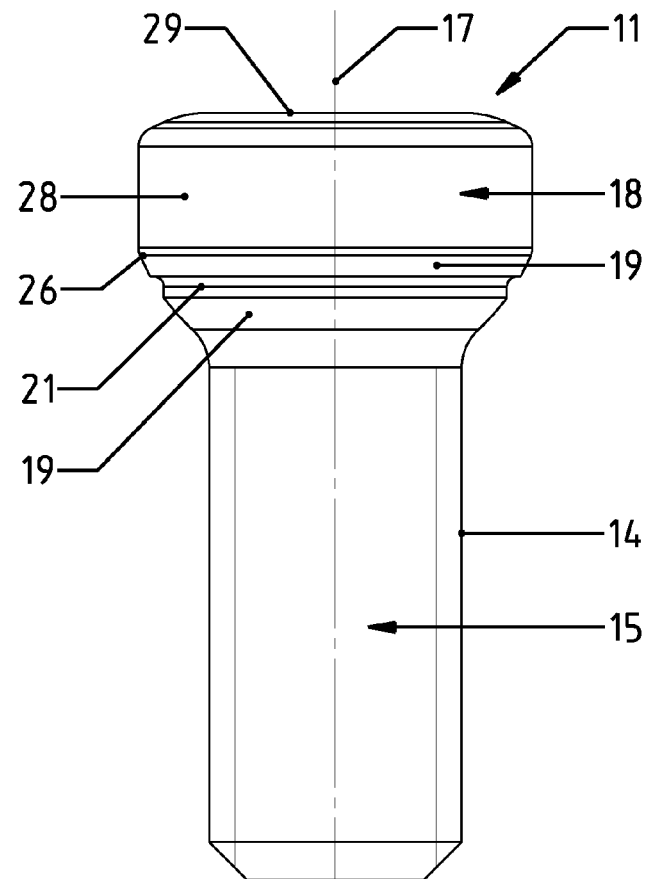

CUTTING TOOL

BACKGROUND OF THE INVENTION

Field of the Invention

The invention relates to a cutting tool.

A cutting tool of this type is known from EP 1 197 281 A. The previously known cutting tool is realized as a milling cutter, the basic tool body of which has several insert seats for the mounting arrangement in each case of one indexable cutter insert. Each indexable cutter insert is secured to the insert seat by means of a dowel pin in the form of a clamping screw. In this case, the clamping screw penetrates a through-hole of the indexable cutting insert and is screwed into a securing hole in the basic tool body, wherein the securing hole extends in an inclined manner with respect to a plane of a bottom surface of the insert seat. The hole wall of the through-hole has a bearing surface on which is mounted a spherical segment-shaped portion of a pin head (realized as a screw head) of the dowel pin or clamping screw. This mounting arrangement of the screw head makes it possible to clamp the indexable cutting insert even in the case of a dowel pin, the center longitudinal axis of which is arranged in a tilted or inclined manner in relation to the bottom surface of the insert seat. In this case, the 360° contact (with reference to the center axis of the through-hole), obtained by the mounting arrangement of the sphere, between the screw head and the bearing surface of the through-hole is to have a stabilizing effect on the assembly position of the indexable cutting insert. However, this 360° mounting arrangement is overdetermined and consequently its mechanical clamping performance is not simple to control.

In addition, U.S. Pat. No. 5,199,828 A and WO 2007/094723 A, for example, make known realizing a bearing contact between the screw head and the corresponding bearing surface of the through-hole of the cutting insert in only a sectional manner (e.g. in a punctiform manner). This structural development of a multi-point contact between the screw head and the through-hole leads to increased wear of the screw head.

BRIEF SUMMARY OF THE INVENTION

The object underlying the invention is to provide a generic cutting tool which avoids the aforementioned disadvantages with the mounting arrangement of the dowel pin.

This object is achieved by a cutting tool—preferably a milling cutter—as claimed in the invention, the portion of the dowel pin provided for the mounting arrangement has a spherical segment, the surface of which is interrupted by a segment groove. The segment groove is incorporated in the spherical segment in the form of a groove, channel, indentation, recess or the like. This means that, on the one hand, the technical advantages of the mounting arrangement of a spherical segment for the dowel pin are maintained. On the other hand, the segment groove avoids the disadvantages of a 360° contact between the bearing portion of the dowel pin and the bearing surface in the through-hole, where a structural overdetermining can impair the mounting arrangement of the dowel pin and consequently the desired clamping of the cutting insert. Rather more, the segment groove, when viewed in the circumferential direction of the bearing surface with reference to the center axis, effects an interruption in the contact between the spherical segment as bearing portion of the dowel pin and the bearing surface of the through-hole. In other words, a multi-point contact with defined contact points or contact zones is created between the spherical segment and the bearing surface—in spite of the basic structure of a mounting arrangement for a spherical segment, wherein these contact zones, together in one plane of the bearing surface, achieve a radian measure smaller than 360°. The segment groove ensures that, irrespective of the angle of the dowel pin (or of its center longitudinal axis) with respect to the bottom surface of the insert seat or with respect to the center axis of the through-hole, a contact zone with a radian measure of 360° is avoided. The aforementioned advantages of the segment groove are obtained irrespective of a specific geometric development of the segment groove.

Two contact zones are realized, in particular, by means of the segment groove (when viewed in a cross sectional plane). Two contact zones are spaced apart in the circumferential direction and together preferably achieve a radian measure of approximately 180°. It is also possible for more than two contact zones to be realized. The number of contact zones is, in particular, a multiple of two contact zones. Several segment grooves are preferably provided. The desired number and the desired radian measure of the contact zones can be achieved with a suitable number and/or geometry of segment grooves.

The term contact point refers, in general, to one contact zone. The contact zones can form punctiform, linear or also planiform contacts between the spherical segment and the bearing surface. By means of the segment groove, specifically developed projections or the like on the bearing surface to realize a multi-point contact can be omitted. As a result, extremely high mechanical loads on the dowel pin also in a punctiform or sectional manner are avoided when the dowel pin is in the assembly position.

As claimed in the invention, consequently, the advantages of a mounting arrangement of a spherical segment are combined with the advantages of a multi-point contact and at the same time the abovementioned disadvantages are avoided.

The dowel pin can also be simply machined subsequently to provide the segment groove. In contrast, more expensive developments of the bearing surface at the cutting insert for realizing a multi-point contact can be avoided, thus saving on costs.

In a preferred embodiment, the spherical segment is arranged on the pin head of the dowel pin. This means that the spherical segment forms a portion of the pin head such that the pin head is used in a proven manner for transmitting the clamping forces.

In a preferred embodiment, the segment groove is closed per se in a circumferential direction with reference to the center longitudinal axis of the dowel pin. This supports a balanced ratio between the contact zones and the contact-free zones (interruption zones) on the bearing surface in its circumferential direction and an even load on the bearing portion (in particular the pin head) of the dowel pin in the circumferential direction. Extreme mechanical load peaks at individual points on the dowel pin are avoided in this way.

A segment groove which is preferably arranged coaxially with respect to the center longitudinal axis of the dowel pin or of the pin head makes it possible for the segment groove to be machined in a simple manner on the pin head.

The spherical segment-shaped portion of the dowel pin is also preferably arranged coaxially with respect to the center longitudinal axis of the dowel pin and in this way additionally supports the machining of the dowel pin in a simple, cost-efficient manner.

In a preferred design, the through-hole is developed in the region of the bearing surface in such a manner that it is tapered in the direction of the bottom surface of the insert seat. This geometry of the through-hole makes it possible for the dowel pin, in particular its pin head, to be mounted in a mechanically sturdy manner, during and after its assembly.

It is advantageous when the through-hole has a circular cross section. In particular, at least the region or portion of the through-hole having the bearing surface is realized in a circular manner. In a structurally simple manner, the circular cross section brings about an evenly sturdy mounting arrangement for the dowel pin, even when the cutting insert is used repeatedly on account of its multitude of cutting edges.

In a further advantageous embodiment, the dowel pin and the through-hole are dimensioned in such a manner that a largest cross section of the spherical segment is greater than a smallest cross section of the bearing surface. This ensures that the spherical segment abuts against the bearing surface in a sturdy manner. In addition, this dimensioning avoids incorrect assembly operations in a reliable manner.

Simple handling of the dowel pin in the through-hole during assembly is achieved when the pin head has a cross section which, at its largest, is as large as the largest cross section of the spherical segment itself. Individual portions of the pin head, for example, then have a cylindrical cross section, the diameter of which, at its largest, is as large as the diameter of the largest spherical segment cross section. A pin head of this type supports dimensioning of the through-hole that is as small as possible, as a result of which the stability of the cutting insert is increased.

A structurally simple development of the through-hole and consequently of the entire cutting insert is achieved when the bearing surface is realized in a rotationally symmetrical manner with respect to the center axis of the through-hole. In particular, apart from the bearing surface, even more portions of the hole wall -for example the entire hole wall or surface -of the through-hole are realized in a rotationally symmetrical manner with respect to its center axis. These preferred embodiments support even distribution of the clamping forces onto the cutting insert.

In a further preferred design variant, the center axis of the through-hole is arranged at a right angle with respect to one surface or with respect to two oppositely situated surfaces of the cutting insert. A surface is realized, in particular, as a machining face or as a contact surface of the cutting insert that faces the bottom surface of the insert seat. In this case, the center axis of the through-hole and the center longitudinal axis of the dowel pin can be arranged at an acute angle with respect to each other. In this case, the center longitudinal axis of the dowel pin is preferably arranged in a tilting or inclined manner with respect to the bottom surface of the insert seat and with respect to the contact surface of the cutting insert corresponding thereto. This means that, where tool design is basically the same, a greater number of insert seats or cutting inserts are able to be provided on the basic tool body.

In a proven embodiment, the dowel pin is realized in a cost-efficient manner as a clamping screw with a screw head as the pin head.

The invention is explained below by way of the exemplary embodiments shown in the drawings, in which, in detail:

BRIEF DESCRIPTION OF THE SEVERAL VIEWS OF THE DRAWING

FIG. 2 shows a perspective representation of a cutting insert as shown in FIG. 1

FIG. 3 shows a side view of a dowel pin for clamping a cutting insert as shown in FIG. 1

DESCRIPTION OF THE INVENTION

Figure 1:
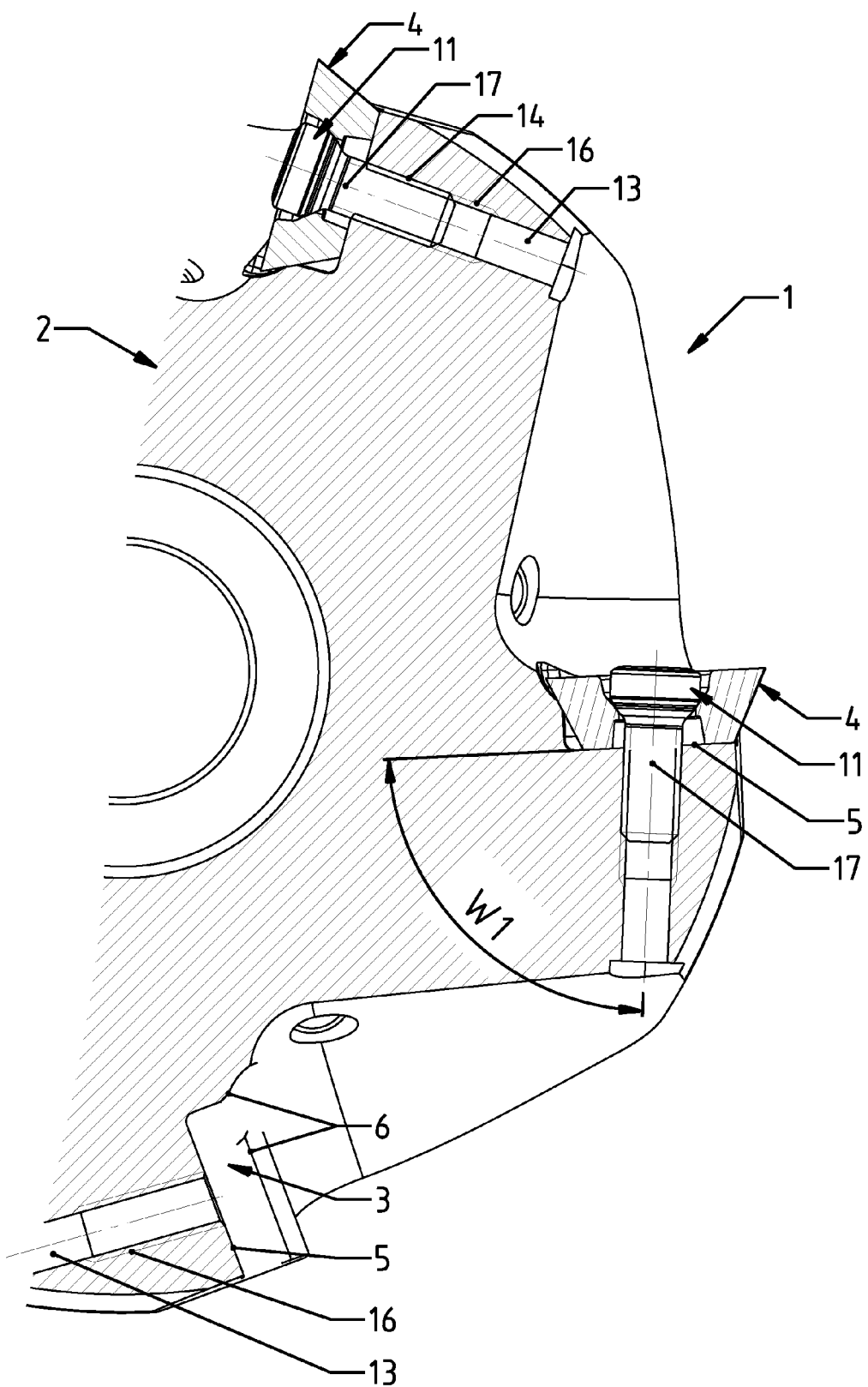
FIG. 1 shows a perspective representation of the cutting tool as claimed in the invention, said cutting tool having a basic tool body and cutting inserts clamped thereon

The cutting tool -1- shown in FIG. 1 is a tool for milling and includes a basic tool body -2-. The head part of the basic tool body -2- has several insert seats -3- for the mounting arrangement of each interchangeable cutting insert -4-. The insert seat -3- has a bottom surface -5- and lateral contact surfaces -6- for positioning the cutting insert -4-. The cutting insert -4- has an octagonal cross section, correspondingly with eight cutting edges -7- (FIG. 2), such that the cutting insert -4- is used repeatedly in each case with one active cutting edge -7-. From a first surface -8- (usually the regions of the machining face) as far as its oppositely situated contact surface -9-, which faces the bottom surface -5- in the assembly position, the cutting insert -4- is penetrated by a central through-hole -10-. The contact surface -9- is supported on the bottom surface -5- in the assembly position of the cutting insert -4-. Each cutting insert -4- is clamped on the insert seat -3- by means of a dowel pin in the form of a clamping screw -11-. In the basic tool body -2-, the clamping screw -11- penetrates the through-hole -10-, which has a central center axis -12-, the bottom surface -5- and a receiving hole -13-, which connects to the bottom surface -5-. The clamping screw -11- is screw-connected to the basic tool body -2- in the receiving hole -13-. To this end, an external thread -14- of a screw shank -15- of the clamping screw -11- corresponds to an internal thread -16- of the receiving hole -13-. A center longitudinal axis -17- of the screw-connected clamping screw -11- is arranged at an acute angle -W1- with respect to the bottom surface -5-.

A pin head in the form of a screw head -18- (FIG. 3) connects to the screw shank -15-. The screw head -18- has a portion in the form of a spherical segment -19-. In the assembly position, the screw head -18- is mounted with its spherical segment -19- on a bearing surface -20- of the through-hole -10-. The surface of the spherical segment -19- is interrupted by a segment groove -21-. This segment groove -21- is closed per se in a circumferential direction -22-. In this case, the segment groove -21- is arranged in a coaxial manner with respect to the center longitudinal axis -17-. The spherical segment -19- is also arranged in a coaxial manner with respect to the center longitudinal axis -17-. Both the segment groove -21- and the spherical segment -19- are arranged in a rotationally symmetrical manner with reference to the center longitudinal axis -17- as a rotational axis.

Figure 4:
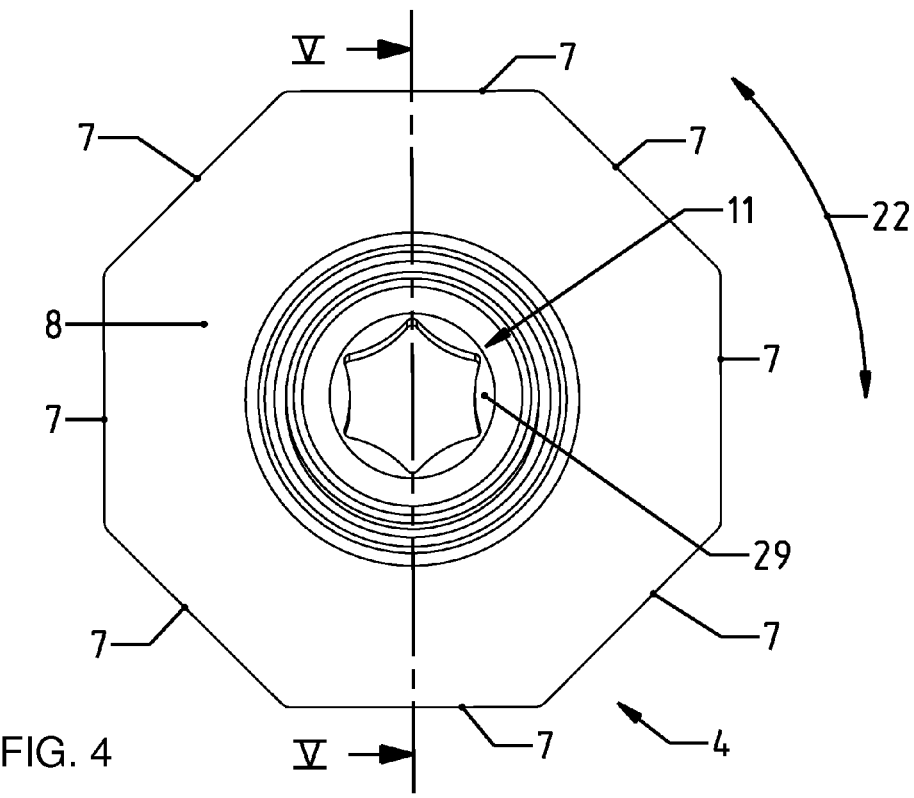
FIG. 4 shows a top view of the cutting insert in FIG. 2 and the dowel pin in FIG. 3 placed thereon
Figure 5:
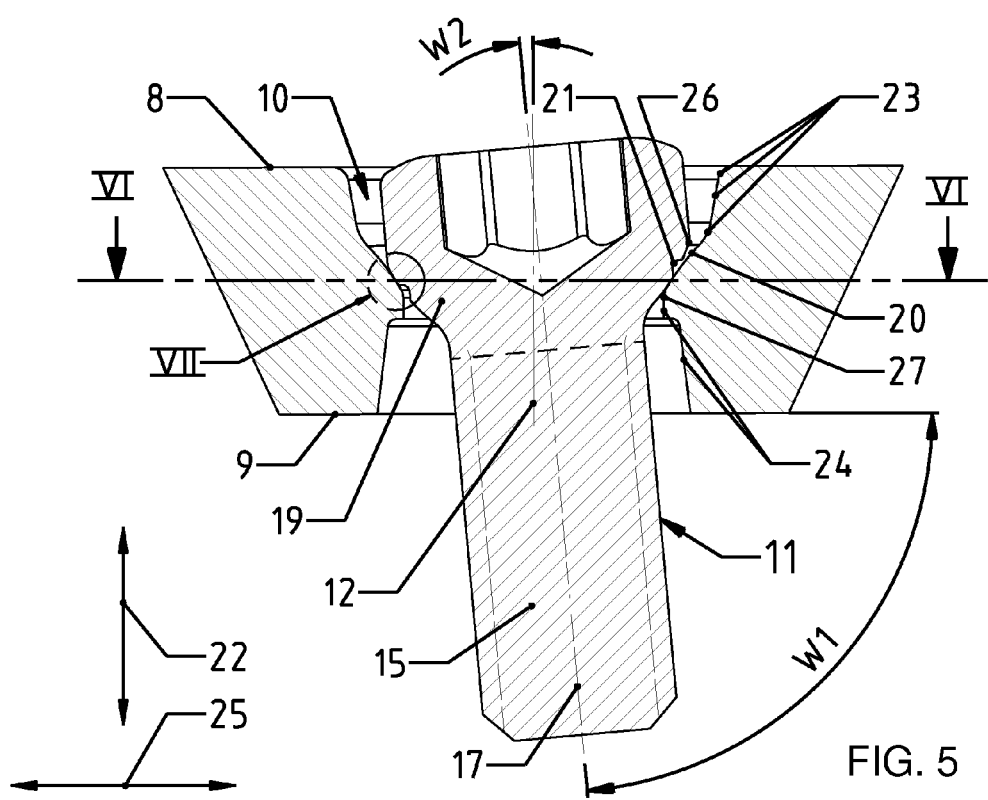
FIG. 5 shows a sectioned side view along the line of intersection V-V in FIG. 4

The hole wall of the through-hole -10- has several portions along the center axis -12-. One portion is formed by the bearing surface -20-, which, when seen in cross section as in FIG. 5, is tapered in the direction of the second surface -9- of the cutting insert -4- that faces the bottom surface -5-. The different portions of the through-hole -10- each have a circular cross section, as can be seen in FIGS. 2 and 4. In this case, the bearing surface -20- and all the remaining portions of the hole wall of the through-hole -10- are realized in a coaxial manner and, on account of their circular cross-section, in a rotationally symmetrical manner with reference to the center axis -12- as a rotational axis.

Several portions -23- of the hole wall of the through-hole -10- are arranged in the axial direction -22- i.e. along the center axis -12-, between the bearing surface -20- and the first surface -8- of the cutting insert -4-. Proceeding from the first surface -8-, the cross sections of said portions -23- are tapered in the direction of the bearing surface -20- (FIG. 5). Several portions -24- of the hole wall are situated between the bearing surface -20- and the contact surface -9- of the cutting insert -4-. In the axial direction -22-, the cross sections of said portions -24- are either constant or widened in a conical manner in the direction of the second surface -9-. On account of the cross sectional development of the individual regions or portions of the hole wall, the through-hole has a so-called trumpet hole for receiving the clamping screw -11- or its screw head -18-. The portions -24- offer sufficient radial play in the radial direction -25- for a clamping screw -11-, which is mounted with its center longitudinal axis -17- in an inclined manner or at an acute angle -W2- with respect to the center axis -12- of the through-hole -10-. In this case, the following applies to the angle -W2-: -W2-=90°-W1-.

The center axis -12- is arranged approximately at a right angle with respect to the first surface -8- and with respect to the oppositely situated contact surface -9-.

It can be seen by way of FIG. 5 that the largest cross section -26- of the spherical segment -19- is greater than the smallest cross section -27- of the bearing surface -20- of the through-hole -10-. The head portion -28- of the screw head -18- connecting directly to said largest cross section -26- is cylindrical and has a diameter which corresponds approximately to the diameter of the largest cross section -26- (FIG. 3). A portion of the screw head -18- arranged between the cylindrical head portion -28- and a free top surface -29- of the screw head -18- is tapered. The free top surface -29- is the outer surface of the screw head -18- which is axially remote from the screw shank -15-.

Figure 6:
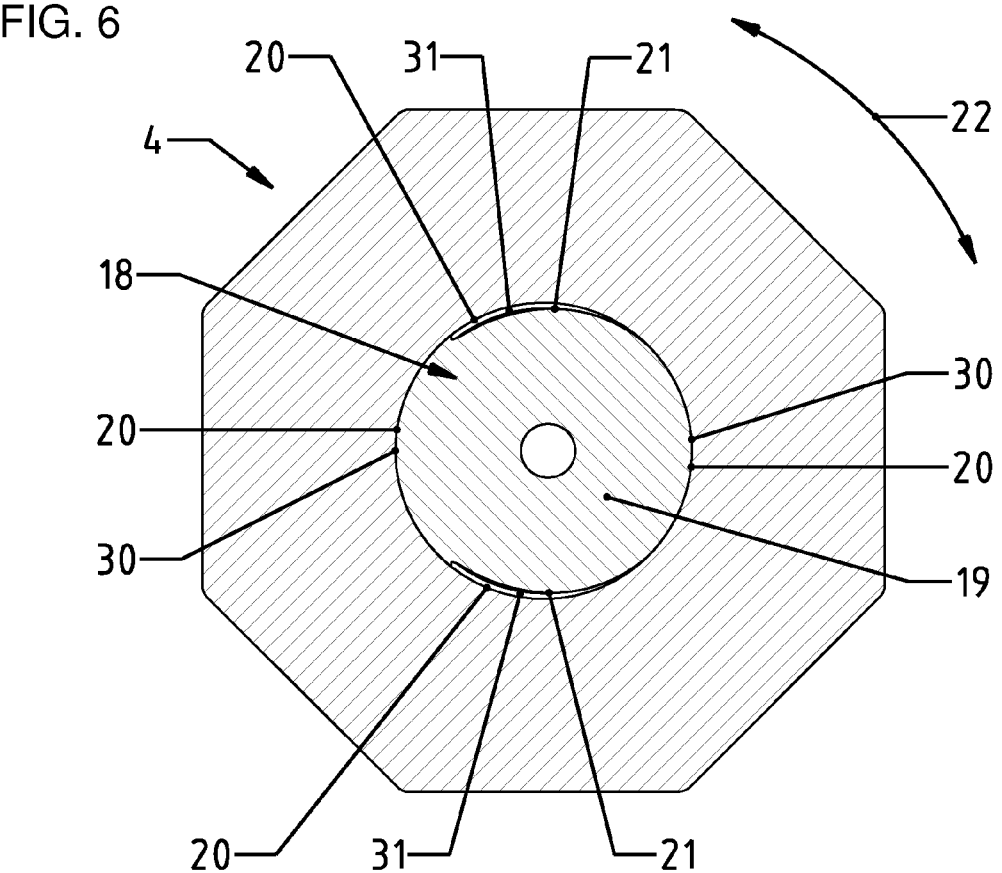
FIG. 6 shows a sectioned top view of the cutting insert and of the dowel pin in FIG. 4, along the line of intersection VI-VI in FIG. 5
Figure 7:
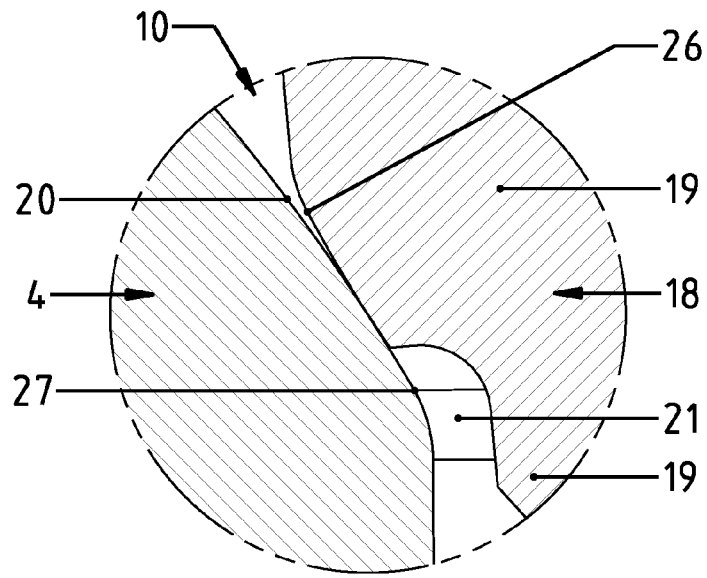
FIG. 7 shows an enlarged representation of the detail VII in FIG. 5.

During the assembly of the clamping screw -11-, the surface of the spherical segment -19- comes to abut against the bearing surface -20- (FIG. 7). On account of the segment groove -21-, no plane exists in which, when viewed along the circumferential direction -22-, a contact zone with a radian measure of 360° is achieved. Rather more, by means of the segment groove -21-, a two-point contact is created between the spherical segment -19- and the bearing surface -20- by two contact zones -30- being formed (FIG. 6). Said contact zones -30-, in the exemplary embodiment, form a linear or planiform contact. The two contact zones -30- are separated from each other in the circumferential direction -22- by means of two interruption zones -31-. The segment groove -21- is effective in said interruption zones -31- as contact interrupting means between the spherical segment -19- and the bearing surface -20-. This means that two longer contact zones -30- and, at the same time, a clearly defined mounting arrangement of the spherical segment -19- of the clamping screw -11- are realized. The advantages of a sphere mounting arrangement for the screw head -18- are combined with the advantages of a multi-point contact between the screw head -18- and the bearing surface -20- in this way and, at the same time, the respective disadvantages are avoided.

The invention claimed is:

1. A cutting tool, comprising:
   A basic tool body;
   a cutting insert having a through-hole formed therein, said through-hole having a center axis and a mounting configuration;
   at least one insert seat disposed on said basic tool body, said insert seat having a bottom surface for receiving said mounting configuration of said cutting insert; and
   a dowel pin penetrating said through-hole of said cutting insert and said bottom surface and secured to said basic tool body, said dowel pin having a center longitudinal axis disposed at an acute angle with respect to said bottom surface, said dowel pin having a pin head and a spherical segment for engaging said mounting configuration on a bearing surface of said through-hole, said spherical segment having a surface divided by a circumferential segment groove formed in said surface, defining a contact zone above said segment groove for making contact between said spherical segment and said bearing surface and a contact zone below said segment groove for making contact between said spherical segment and said bearing surface when said dowel pin and said cutting insert are mounted to said basic tool body.

2. The cutting tool according to claim 1, wherein said spherical segment is disposed on said pin head.

3. The cutting tool according to claim 1, wherein said segment groove is a closed groove extending in a circumferential direction with reference to said center longitudinal axis.

4. The cutting tool according to claim 1, wherein said segment groove is disposed coaxially with respect to said center longitudinal axis.

5. The cutting tool according to claim 1, wherein said spherical segment is disposed coaxially with respect to said center longitudinal axis.

6. The cutting tool according to claim 1, wherein in a region of said through-hole, said bearing surface is tapered in a direction of said bottom surface of said insert seat.

7. The cutting tool according to claim 1, wherein said through-hole has a circular cross section.

8. The cutting tool according to claim 1, wherein a largest cross section of said spherical segment is greater than a smallest cross section of said bearing surface of said through-hole.

9. The cutting tool according to claim 1, wherein said pin head has individual portions with a cross section which, at its largest, is as large as a largest cross section of said spherical segment.

10. The cutting tool according to claim 1, wherein said bearing surface defining part of said through-hole has a center axis and is formed in a rotationally symmetrical manner with respect to said center axis.

11. The cutting tool according to claim 10, wherein said through-hole has a center axis and is formed in a rotationally symmetrical manner with respect to said center axis along an entire length of said through-hole.

12. The cutting tool according to claim 1, wherein said through-hole has a center axis disposed at a right angle with respect to a surface of said cutting insert.

13. The cutting tool according to claim 1, wherein said through-hole has a center axis, and said center axis of said through-hole and said center longitudinal axis of said dowel pin are disposed at an acute angle with respect to each other.

14. The cutting tool according to claim 1, wherein said dowel pin is a clamping screw with a screw head as said pin head.

15. The cutting tool according to claim 1, wherein said through-hole, in a region of said bearing surface, has a circular cross section.

16. The cutting tool according to claim 1, wherein said through-hole has a center axis disposed at a right angle with respect to a contact surface of said cutting insert which faces said bottom surface.

* * * * *